United States Patent
Fischer

(10) Patent No.: US 8,731,770 B2
(45) Date of Patent: May 20, 2014

(54) METHOD AND APPARATUS FOR DETERMINING AND STORING EXCESSIVE VEHICLE SPEED

(75) Inventor: Jonathan Fischer, Lunenburg, MA (US)

(73) Assignee: Speed Demon Inc., Lunenburg, MA (US)

( * ) Notice: Subject to any disclaimer, the term of this patent is extended or adjusted under 35 U.S.C. 154(b) by 1351 days.

(21) Appl. No.: 11/370,651

(22) Filed: Mar. 8, 2006

(65) Prior Publication Data
US 2007/0213896 A1    Sep. 13, 2007

(51) Int. Cl.
*G01C 21/26* (2006.01)

(52) U.S. Cl.
USPC .......... 701/33.4; 701/29.1; 701/33.2; 701/36; 701/430

(58) Field of Classification Search
USPC .......... 701/35, 29, 1, 29.1, 33.2, 33.4, 36, 70, 701/93, 400, 408, 409, 430, 461, 463; 340/438, 439
See application file for complete search history.

(56) References Cited

U.S. PATENT DOCUMENTS

| | | | |
|---|---|---|---|
| 4,843,578 A * | 6/1989 | Wade | 702/142 |
| 6,166,658 A * | 12/2000 | Testa | 701/93 |
| 6,473,000 B1 * | 10/2002 | Secreet et al. | 340/936 |
| 6,522,267 B2 * | 2/2003 | Flick | 340/989 |
| 6,556,905 B1 * | 4/2003 | Mittelsteadt et al. | 701/32.4 |
| 6,701,234 B1 * | 3/2004 | Vogelsang | 701/32.4 |
| 6,748,322 B1 * | 6/2004 | Fernandez | 701/484 |
| 7,356,392 B2 | 4/2008 | Hubbard et al. | |
| 2001/0018628 A1 * | 8/2001 | Jenkins et al. | 701/35 |
| 2002/0029109 A1 * | 3/2002 | Wong et al. | 701/213 |
| 2002/0091473 A1 * | 7/2002 | Gardner et al. | 701/35 |
| 2002/0173881 A1 * | 11/2002 | Lash et al. | 701/1 |
| 2003/0058083 A1 * | 3/2003 | Birchfield | 340/5.22 |
| 2003/0125854 A1 * | 7/2003 | Kawasaki et al. | 701/35 |
| 2004/0030483 A1 * | 2/2004 | Muehlbauer | 701/93 |
| 2004/0236474 A1 * | 11/2004 | Chowdhary et al. | 701/1 |
| 2005/0137757 A1 * | 6/2005 | Phelan et al. | 701/1 |

* cited by examiner

Primary Examiner — Stephen Holwerda
(74) Attorney, Agent, or Firm — Chapin IP Law, LLC

(57) ABSTRACT

The present invention is a data logger for collecting information about operation of vehicle for monitoring by a parent or supervisor. The data logger includes speed limits for highway and local streets. The data logger includes an algorithm estimating whether the vehicle is being operated on a highway or local street. An alert status is determined when the corresponding speed limit is exceeded. Alert information is recorded for later display and review by the parent or supervisor.

14 Claims, 2 Drawing Sheets

METHOD AND APPARATUS FOR DETERMINING AND STORING EXCESSIVE VEHICLE SPEED

BACKGROUND OF THE INVENTION

1. Field of the Invention

The present invention relates to a method and apparatus for monitoring operation of a vehicle. More particularly, it relates to a method and apparatus for determining when the speed limit is exceeded and recording information for later review.

2. Discussion of Related Art

Automobile safety continues to be a major concern of government and its citizens. While automobiles are constantly being made safer, the major factor in most accidents is operator performance. This is particularly true for teenagers and other inexperienced drivers. In order to improve performance of teenage drivers, many special laws have be passed to limit operation of vehicles by teenagers. However, such laws are only successful if they are followed.

Excessive vehicle speed is a major problem throughout the United States and a principal factor in many accidents, particularly by teenagers. Despite government campaigns to encourage adherence to speed limits, many drivers fail to follow these requirements. Too often tragic consequences result when inexperienced drivers follow others in exceeding speed limits. Parents can provide an important deterrent to improper vehicle use. Generally, teenagers are driving a vehicle owned or controlled by their parents. However, parental control is not effective if they are unable to monitor operation of the vehicle. Typically, the parents are not in the vehicle when it is being operated by a teenager.

A number of commercial devices have been created or proposed which allow others to monitor the operation of a vehicle. These are intended for use by parents with their teenagers or by vehicle fleet supervisors with their driver employees. Generally, such devices are placed in the vehicle and record information regarding operation of the vehicle. In some instances, the device is directly connected to the vehicle to receive information, such as the speed of the vehicle. In other instances, the device includes a compass, gyroscope, or GPS receiver for determining speed and/or position of the vehicle over time.

With such monitoring devices, the parent or supervisor wants to know where the vehicle has been driven, how it has been driven, and whether speed limits have been exceeded. The devices use various mechanism for providing the information. In most cases, the device records information about vehicle operation at periodic time intervals. Such information may include location, speed and direction. The information can be later reviewed by the parent or supervisor, in conjunction with mapping software, to determine vehicle route. The mapping software may include speed limit information for various roads which can be compared to the recorded speeds to determine whether any limits were exceeded. Other devices include mapping software in the memory of the device with associated speed limits. The device can then use the location and speed information to determine whether a vehicle is operated above limits. When limits are exceeded, the device can store the information for later review by the parent or supervisor.

Alternatively, the device can transmit the information to the parent or supervisor in real time. Some devices use gyroscopes or other mechanisms to determining operational characteristics of the vehicle in addition to speed. These operational characteristics are also recorded for later review.

These monitoring devices allow detailed review of vehicle operation. However, many times, while parents are concerned about their teenager's driving habits, they are not interested in reviewing a detailed analysis of every trip. Similarly, since teenagers often feel that they are being overly controlled by their parents, such detailed review of vehicle operation is more likely to cause conflict within the home rather than to improve teenage driver performance.

Furthermore, in order to monitor speed limits, detailed maps and speed limit data must be compared to the information recorded by the monitoring device. This requires a complicated monitoring device or processing system. Therefore, a need exists for a simple device for monitoring and recording operational characteristics of a vehicle in order to facilitate communication and supervision by parents with their teenage drivers.

SUMMARY OF THE INVENTION

The present invention is a device for monitoring vehicle operation. It includes a GPS receiver for determining location and speed of the vehicle. According to one aspect of the invention, the device stores vehicle information when a predetermined speed limit is exceeded.

According to another aspect of the invention, the device stores information when a second predetermined speed limit is exceeded for less than a predetermined period of time. According to another aspect of the invention, the device stores information when the device becomes non-operational.

According to another aspect of the invention stored information includes date, time, location, speed and heading. According to another aspect of the invention, the device includes a visual indication when information has been stored. According to another aspect of the invention, the device receives transmitted speed limit information relating to a location of the vehicle. The transmitted speed limit information is used as the first predetermined speed limit for determining when to store information.

According to another aspect of the invention, the information stored by the monitoring device is transferred to a computer for processing and display. The stored information can be displayed by the computer. Alternatively, the computer includes a mapping function for indicating locations within the stored information.

DETAILED DESCRIPTION

The present invention is a GPS enabled data logger that is designed to mount in a vehicle and log incidents of excess vehicle speed. The heart of the present invention is an algorithm that determines whether a driver is exceeding predefined speeds on either a highway or a secondary road. When defined conditions are met, information about operation of the vehicle is stored in a memory of the data logger. The stored information is later retrieved and displayed with a map of the location of the vehicle when the information was stored.

Figure 1:
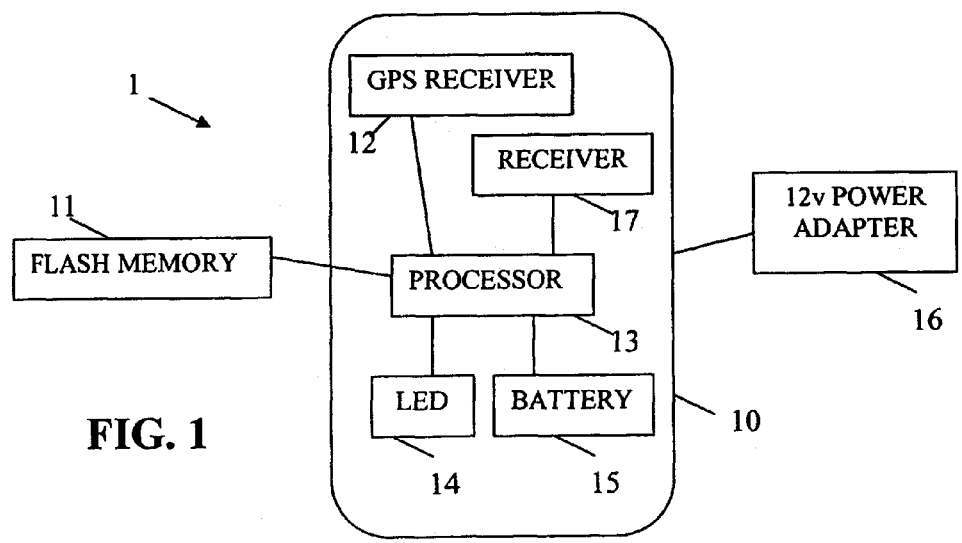
FIG. 1 is a block diagram of a vehicle operation monitoring device according to an embodiment of the present invention.

An embodiment of the data logger 1 is illustrated in FIG. 1. The data logger 1 includes a processing system 10, a removable flash memory 11, and a 12v power adapter 16. The data logger 1 includes a housing (not shown) which allows it to be mounted to the dashboard of the vehicle to be monitored. Various mechanisms can be used to mount the data logger 1 to the dashboard. For example, 3M DualLock™, Velcro® or a similar material is attached to the dashboard and housing. The data logger 1 can be easily mounted and removed from the vehicle.

Also, the mounting material can be placed in more than one vehicle so that the data logger 1 can be placed within any vehicle used by the driver to be monitored. The 12v power adapter 16 is plugged into a 12 volt power receptacle on the vehicle. Power from the vehicle is used for operation of the data logger 1. Preferably, the vehicle power receptacle supplies continuous power, even if the ignition is turned off. In this manner, the data logger is always functioning and can constantly monitor operation of the vehicle. In addition, the data logger 1 has an internal battery 15 to provide power when it is not plugged into the receptacle. The battery 15 may be rechargeable when the data logger 1 is plugged in.

The processing system 10 of the data logger 1 includes a GPS receiver 12 and a processor 13 for determining speed and location of the vehicle. The processor 13 reads the NMEA 0183 specified $GPRMC Recommended minimum specific GPS/Transit data (RMC) data stream from the GPS receiver 12 once per second. The RMC data stream includes the present latitude and longitude and the speed and direction of motion. This information is used by the processor to determine operational characteristics of the vehicle. Specifically, the processor 13 compares the speed information to stored values to determine whether or not a defined alert state exists, as discussed below. If an alert state exists, the RMC data and alert state information are saved to flash memory 11. Of course, other types of memory could be used for storing the information.

Preferably, a non-volatile memory is used so that the information is maintained even if the data logger 1 is disconnected from a power source. Furthermore, when information is saved in flash memory 11, an LED 14 on the processing system 10 is illuminated. Whether an alert state occurred can be determined simply by looking at the data logger 1.

If information is stored on the flash memory, as indicated by the LED 14, the information can be retrieved and reviewed by the parents. For the data logger 1 illustrated in FIG. 1, the flash memory 11 can be disconnected from the processor 13 of the processing system 10. Note:

currently flash memory is permanently connected to processor and has another USB interface which connects to the computer, so the whole device plugs into the host computer's USB for configuration and reading/display of alerts. Preferably, the flash memory 11 and the processing system 10 are connected using a Universal Serial Bus (USB) interface. The same interface can be used to connect the flash memory to a computer for display of alert information. The flash memory 11 may be connected using other interfaces. Alternatively, the data logger 1 may include a interface for direct connection with a computer. In order to retrieve and review alert information, the flash memory 11 is connected to the USB port on a computer. The flash memory 11 mounts on the computer as a removable mass storage device with a specified volume name. When the user, generally the parent, selects the volume name, the volume is opened in a new window and a listing of stored alert files are displayed. The information corresponding to each alert state is stored in the flash memory 11 as a separate file. The information from the alert file can be displayed by selecting the filename from the listing of alert states. According to an embodiment of the invention, the file is opened in the operator's default browser and browser passes the alert information to a designated server over the Internet. The designated server includes software for processing and displaying the alert information for the user. With this embodiment, the user does not require any additional software on the computer. Any computer which is connected to the Internet can be used to review the stored alert information.

Figure 2:
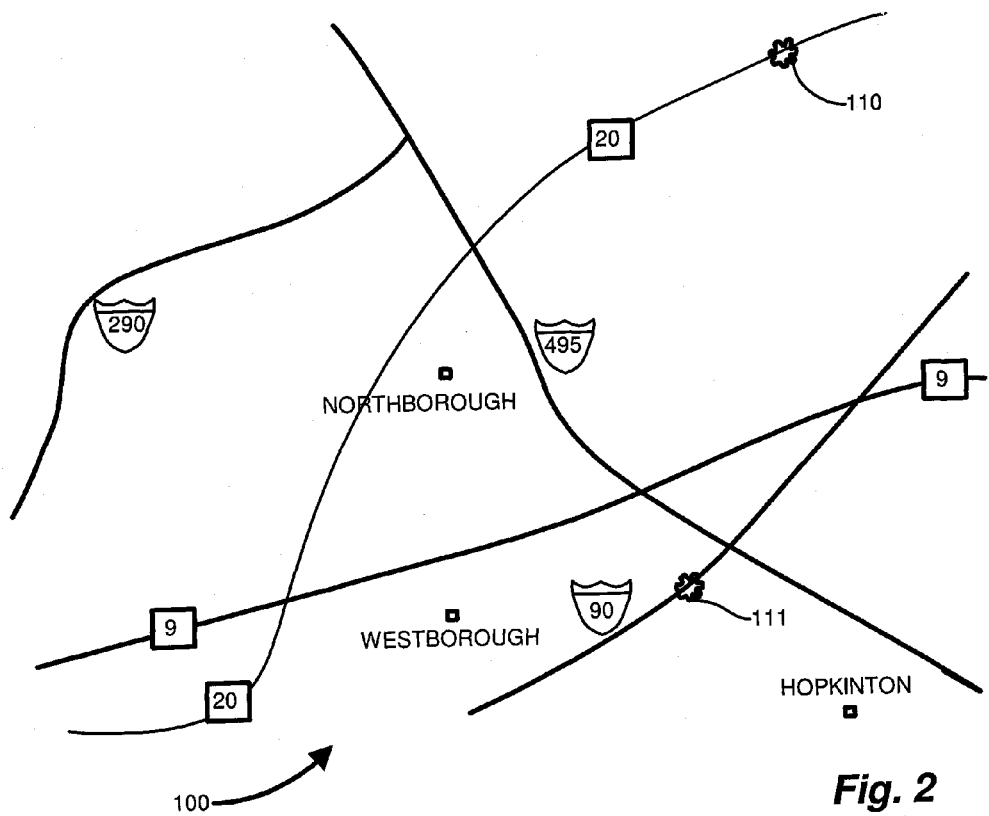
FIG. 2 is an illustrative display of stored location information according to an embodiment of the present invention.

Alternatively, the processing and display software programs could be installed on the user's computer. Thus, Internet access might not be needed to process and display the alert information. During processing of the alert information, the server retrieves a map from an online map server, such as Google Maps, corresponding to the coordinates (latitude and longitude) in the alert information. Of course, maps can be stored on the server or on the user's computer for use with the present invention instead of using a commercial map server. The server passes the map information and the additional alert information to the browser for display. FIG. 2 illustrates a map 100 for display. The map 100 includes indications 110, 111 of locations where alerts occurred. The display further includes the alert information (not shown), such as speed, time and direction or heading.

The data logger of the present invention compares the speed retrieved from the GPS receiver to two different speed limits, one for highway speeds and one for local streets. Most monitoring devices permit only one limit to be set. Thus, if the limit is set for highway speeds, excessive speed on local streets, which have lower speed limits, will not be properly identified.

If the limit is set for local streets, all highway driving will be identified as excessive. According to an embodiment of the present invention, the retrieved speeds of the vehicle are used to estimate whether the vehicle is being driven on a highway or local street. Two different speed limits are used. A MAX speed represents the limit for highway driving, such as 55 mph or 65 mph. A LOW speed represents the limit for local streets, such as 35 mph or 40 mph. The exact limits are set by the user, i.e., the parent, based upon local conditions. Any time that the speed exceeds the MAX speed, an alert state is determined to exist. If the speed is less than the LOW speed, an alert state does not exist. When traveling on a highway, the operator will constantly exceed the LOW speed limit. However, when traveling on local streets and exceeding the LOW speed , conditions will likely cause the operator to slow the vehicle periodically, so that the speed drops below the LOW speed. The algorithm for determining the alert states uses this fact to estimate whether the vehicle is being driven on a highway or local streets. When the speed is between the LOW speed and the MAX speed, the system monitors how long the speed is in that state. If the speed is in this middle state for longer than a predetermined time, such as 1 minute, the algorithm determines that the vehicle is traveling on a highway. If the speed drops below the LOW speed before the predetermined time expires, then the algorithm estimates that the vehicle is being driven on local streets. Since the vehicle exceeded the limit for local streets, an alert state is determined to exist.

Figure 3:
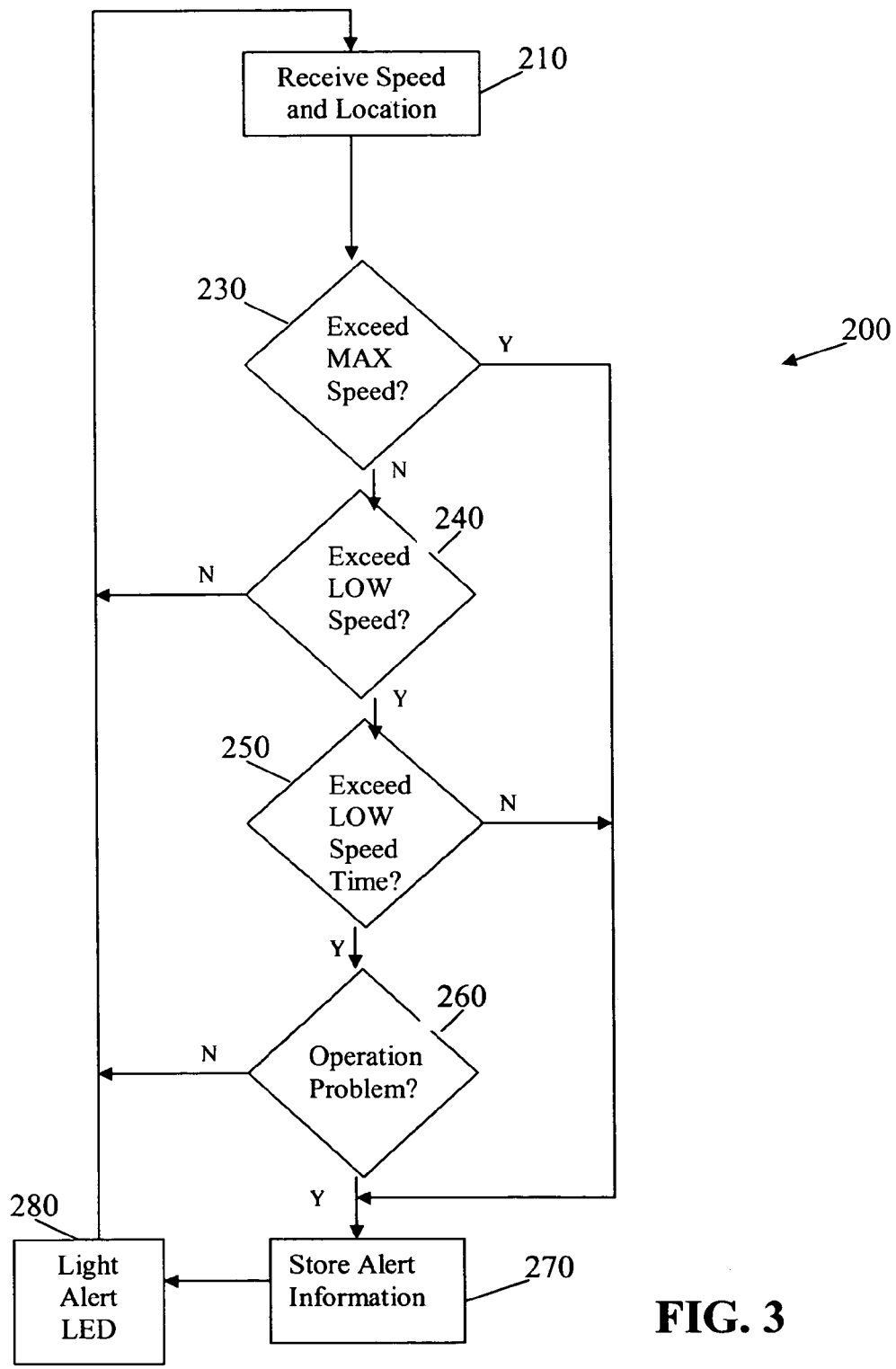
FIG. 3 is a block flow diagram of operation of a monitoring device according to an embodiment of the present invention.

The process 200 for determining whether or not an alert state exists is illustrated in the block flow diagram of FIG. 3. At step 210, the position and speed information is retrieved from the GPS receiver. If the speed is 0 or less than a defined lower limit, no further processing is required. Thus, the additional steps of the process are not performed. When the speed is greater than 0 (or the defined lower limit), at step 230, the speed is compared to a MAX speed stored in a parameters file. If the MAX speed is exceeded, an alert condition exists and the process proceeds to step 270. At step 240, the speed is compared to a LOW speed stored in the parameters file. If the speed is below the LOW speed, no further processing is required and the process returns to step 210. If the speed is greater than the LOW speed, a timer is set (if the speed was not previously above the LOW speed) or decremented (if the speed was previously above the LOW speed). If the speed drops below the LOW speed before the timer reaches zero, an alert condition exists and the process continues at step 270. If the timer expires while the LOW speed is exceeded, an alert state does not exist and the process proceeds at step 260.

At step 260, a determination is made as to the operational performance of the data logger. The process determines that an alert state exists if operation of the data logger is inhibited. This prevents the vehicle operator from tampering with the data logger to avoid determination of or storing of alert states. For example, if the GPS receiver does not receive a sufficiently clear signal to determine location and speed, a operator may have shielded the data logger. When the GPS receiver does not receive proper signals, the data status indicator field, which is field 2 of the $GPRMC sentence will be set to "V" which indicates navigation receiver warning.

Alternatively, when the GPS receiver does not receive proper signals, the mode indicator field, which is field 12 of the $GPRMC sentence will be set to "N" which indicates "data not valid".

Since natural conditions may prevent operation of the GPS receiver under certain conditions, an alert state is determined only after the data status indicator is set to "V" or the mode indicator is set to "N" for a predetermined number of consecutive $GPRMC sentences. Similarly, disconnection of the flash memory or the power adapter may signify operator interference and an alert state is determined to exist under these conditions.

The data logger of the present invention can also be used to monitor the time of vehicle operation. Many states have laws which limit the times during which teenage drivers may operate a vehicle. Parents may impose additional limits. Since the GSP receiver provides the current time, the data logger can determine whether the vehicle is being operated outside of the allowed limits. An alert state is determined to exist when the time is not within allowed limits.

If an alert state is determined to exist, the alert information is stored at step 270. Alert information includes the type of alert, date, time, latitude and longitude, speed and heading.

According to an embodiment of the invention, the alert information is stored in HTML format so that it can be retrieved and viewed using a browser. The alert type represents the reason that the alert state was determined to exist. Alert types include: highway speeding (MAX speed exceeded), residential speeding (LOW speed exceeded for less than predetermined time), device removal (flash memory or power removed), antennal blockage (field 2 of the $GPRMC sentence is set to "V" or field 12 of the $GPRMC sentence is set to "N"), and curfew (time outside limits).

After the alert information is stored, an alert LED is turned on. Thus, the presence of alert information in the flash memory can be easily determined by looking at the data logger.

The data logger 1 of the present invention allows the users, i.e., the parents to set various parameters for operation. The parameters are stored in a parameters file in the flash memory 11.

A configuration utility, also stored in the flash memory 11, operates to set the parameters. When the flash memory is connected to the computer, the configuration utility is run to set the necessary parameters. For security purposes, the configuration utility can only be run if the password matches a password set in the parameters file. The parameters file is a hidden file and can only be accessed by the configuration utility. The configuration utility is also used to erase alerts after they have been viewed. The parameters file includes: the password, MAX speed in mph, LOW speed in mph, strictness time for timer (between 5 and 120 seconds), curfew start and end times, and local time zone. The local time zone is used to convert the GSP times into local times for the alert information.

According to another embodiment of the invention, the data logger includes a receiver 17 for receiving transmitted speed information. In this embodiment, the data logger receives a MAX speed through the receiver 17 which is applicable to the road being traveled. Transmitters are located along the road. Transmitters may be placed on speed limit signs. Since limits periodically change along a road, the transmitted information may include directional information as to the applicable speed limit for each direction on the road. The transmitted speed limits could also be adjusted for weather conditions to ensure that inexperienced drivers are properly accounting for road conditions.

According to another embodiment of the invention, the receiver 17 obtains speed limit information from a wireless network, such as a cellular telephone network. The data logger 1 transmits is position and heading over the wireless network to a GIS encoded database having speed limit information. The database determines and transmits the speed limit for the current location and direction of the vehicle. As with the prior embodiment, the received speed is used as the MAX speed for determined alert status. The speed limits in the database can be adjusted for weather conditions.

Having disclosed at least one embodiment of the present invention, various adaptations, modifications, additions, and improvements will be readily apparent to those of ordinary skill in the art. Such adaptations, modifications, additions and improvements are considered part of the invention which is only limited by the several claims attached hereto.

The invention claimed is:

1. In a driving environment having highways and local streets, and having a speed limit corresponding to each of the road types of highways and local streets, a processor based method of determining vehicular adherence to the speed limits comprising:

receiving, from a user interface of a processor controlled device, a user settable selection for a speed limit for each of road types of highways and local streets, the user selected speed limit independent of a legal speed limit set by a relevant governing authority;

computing, by the processor, adherence to the speed limits by:

receiving a measurement of a current speed of a vehicle;

identifying that a current speed exceeds the received speed limit corresponding to a road type of local road;

determining, if within a predetermined time, the current speed drops below the exceeded speed limit;

determining a road type of a current location as one of a highway or a local street, determining further comprising:

concluding, if the current speed drops below the exceeded speed limit within the predetermined time, that the vehicle was speeding on a local street;

concluding, if the current speed remains above the exceeded speed limit for the predetermined time, that the vehicle was traveling on a highway and was not speeding; and concluding, if the current speed exceeds the speed limit corresponding to a road type of highway, that the vehicle was speeding.

2. The method of claim 1 further comprising determining, based on a computed duration of travel above the exceeded speed limit, the road type currently being traveled.

3. The method of claim 1 further comprising receiving, by the processor, the current speed from a vehicle speedometer subsystem independently of an external GPS location signal.

4. A method for determining safe driving comprising:
Identifying, in a processor device having stored information on a plurality of road types and determining, for each of the plurality of road types, a speed limit, the plurality of speed limits defining a range of speeds for a continuum of road types of increasing allowable speed;
receiving a measurement of a current speed of a vehicle;
identifying that a current speed exceeds the speed limits corresponding to a particular type of road;
determining, a duration of travel during which current speed remains above the exceeded speed limit; and
determining, based on the duration of travel above the exceeded speed limit, the road type currently being traveled;
concluding, based on the duration of travel above the exceeded speed, whether the vehicle was speeding; and
concluding, if the current speed falls below the exceeded speed limit before expiration of a predetermined time, that the vehicle was speeding and was traveling on the road type corresponding to the next lower speed limit on the continuum of road types from the road type corresponding to the exceeded speed.

5. The method of claim 4 further comprising concluding, by the processor, if the predetermined time expires without the current speed falling below the identified speed limit, that the vehicle is traveling on the road type corresponding to the greater speed limit.

6. The method of claim 4 wherein the speed limits are independent of a legal speed limit established by a relevant governing authority.

7. The method of claim 6 further comprising receiving, from a graphical user interface of a user device responsive to the processor, the speed limits corresponding to each of the road types.

8. The method of claim 6 further comprising, receiving, from a user device interface to the processor, a plurality of selections of road type and corresponding applicable speed limits for each selected road type.

9. The method of claim 6 wherein the road type includes highways and local street.

10. The method of claim 9 wherein the road types are based on road conditions of the road being traveled.

11. The method of claim 4 wherein a duration of travel less than the predetermined time is deemed to establish speeding on the road type corresponding to the next lowest speed limit.

12. A computer program product encoded as instructions on a non-transitory computer readable storage medium, the instructions for method of determining safe vehicle driving practices comprising:
launching an application on a personal device located appurtenant to the driver of a vehicle;
receiving a user settable selection for a speed limit for each of road types of highways and local streets, the user selected speed limit independent of a legal speed limit set by a relevant governing authority;
receiving a measurement of a current speed of the vehicle;
identifying that a current speed exceeds the received speed limit corresponding to a road type of local road;
determining, if within a predetermined time, the current speed drops below the exceeded speed limit;
determining, based on at least one of the expiration of the predetermined time or the vehicle speed falling below the exceeded speed limit, a road type of a current vehicle location as one of a highway or a local street; and
concluding either that:
if the speed fell below the exceeded speed limit before expiration of the predetermined time, then the vehicle was speeding on a local street, or
when the predetermined time expires before the speed falls below the exceeded speed limit then the vehicle was traveling an accepted speed limit on a highway.

13. The method of claim 12 further comprising Identifying the threshold speed for the local street speed limit distinguishing highways from local streets, the threshold speed received from a user and pertaining to a speed limit on a particular type of road.

14. The method of claim 12 further comprising identifying a threshold time limit, the threshold time limit corresponding to a duration of travel at an elevated speed limit deemed to establish travel on a road type applicable to the elevated speed limit.

* * * * *